United States Patent
Malvern et al.

(10) Patent No.: US 10,422,811 B2
(45) Date of Patent: Sep. 24, 2019

(54) ACCELEROMETERS

(71) Applicant: Atlantic Inertial Systems Limited, Plymouth, Devon (GB)

(72) Inventors: Alan Richard Malvern, Plymouth (GB); Kiran Harish, Plymouth (GB)

(73) Assignee: ATLANTIC INERTIAL SYSTEMS, LIMITED, Plymouth, Devon (GB)

( * ) Notice: Subject to any disclaimer, the term of this patent is extended or adjusted under 35 U.S.C. 154(b) by 91 days.

(21) Appl. No.: 15/118,995

(22) PCT Filed: Feb. 16, 2015

(86) PCT No.: PCT/GB2015/050435
§ 371 (c)(1),
(2) Date: Aug. 15, 2016

(87) PCT Pub. No.: WO2015/124910
PCT Pub. Date: Aug. 27, 2015

(65) Prior Publication Data
US 2016/0356806 A1    Dec. 8, 2016

(30) Foreign Application Priority Data
Feb. 19, 2014    (GB) .................................. 1402936.7

(51) Int. Cl.
*G01P 15/125*    (2006.01)
*G01P 15/08*    (2006.01)

(52) U.S. Cl.
CPC .... *G01P 15/125* (2013.01); *G01P 2015/0814* (2013.01)

(58) Field of Classification Search
CPC ........ G01P 15/125; G01P 15/08; G01P 15/18; G01P 15/0802
See application file for complete search history.

(56) References Cited

U.S. PATENT DOCUMENTS 5,563,343 A * 10/1996 Shaw .................... B81B 3/0051
                                                              73/514.18
5,569,852 A * 10/1996 Marek ................. G01P 15/0802
                                                                 361/280

(Continued)

FOREIGN PATENT DOCUMENTS

EP        1626283 A1    2/2006
EP        1860402 A1    11/2007
(Continued)

OTHER PUBLICATIONS

Notification of Transmittal of the International Search Report and the Written Opinion of the International Searching Authority, or the Declaration; PCT/GB2015/050435; dated Apr. 17, 2015; 13 pages.

(Continued)

*Primary Examiner* — Helen C Kwok
(74) *Attorney, Agent, or Firm* — Cantor Colburn LLP

(57) ABSTRACT

A sensing structure for an accelerometer includes a support and a proof mass mounted to the support by flexible legs for in-plane movement in response to an applied acceleration along a sensing direction. The proof mass includes a plurality of moveable electrode fingers extending substantially perpendicular to the sensing direction and spaced apart in the sensing direction. The structure also includes at least one pair of fixed capacitor electrodes comprising first and second sets of fixed electrode fingers extending substantially perpendicular to the sensing direction and spaced apart in the sensing direction; the first set of fixed electrode fingers arranged to interdigitate with the moveable electrode fingers with a first offset in one direction from a median line therebetween, and the second set of fixed electrode fingers arranged to interdigitate with the moveable electrode fingers with a second offset in the opposite direction from a median line therebetween.

18 Claims, 2 Drawing Sheets

(56) References Cited

U.S. PATENT DOCUMENTS

| | | | | |
|---|---|---|---|---|
| 5,983,721 | A * | 11/1999 | Sulzberger | B81B 3/0072 361/280 |
| 7,047,808 | B2 * | 5/2006 | Malvern | G01P 15/0802 73/514.12 |
| 7,051,590 | B1 * | 5/2006 | Lemkin | G01C 19/5719 73/504.04 |
| 7,322,242 | B2 * | 1/2008 | Merassi | B81B 7/0048 257/734 |
| 8,207,586 | B2 * | 6/2012 | Sato | B81B 7/007 257/415 |
| 8,443,671 | B2 * | 5/2013 | Classen | B81B 3/0072 438/50 |
| 8,516,890 | B2 * | 8/2013 | Rehle | G01P 15/125 73/514.32 |
| 8,610,222 | B2 * | 12/2013 | Lin | B81B 3/0072 257/414 |
| 9,010,184 | B2 * | 4/2015 | Zou | G01P 15/125 73/504.12 |
| 9,476,907 | B2 * | 10/2016 | Malvern | G01P 15/125 |
| 2005/0132805 | A1 * | 6/2005 | Park | G01P 15/125 73/514.32 |
| 2006/0032310 | A1 * | 2/2006 | Merassi | B81B 7/0048 73/514.35 |
| 2007/0144258 | A1 | 6/2007 | Chu et al. | |
| 2007/0272015 | A1 * | 11/2007 | Kazama | G01C 19/5712 73/504.08 |
| 2009/0183570 | A1 | 7/2009 | Acar et al. | |
| 2009/0282914 | A1 * | 11/2009 | Rehle | G01P 15/125 73/504.12 |
| 2009/0320596 | A1 | 12/2009 | Classen et al. | |
| 2011/0174074 | A1 * | 7/2011 | Li | G01C 19/5755 73/504.14 |
| 2012/0262026 | A1 * | 10/2012 | Lin | B81B 3/0072 310/300 |
| 2013/0104654 | A1 * | 5/2013 | Classen | G01P 15/125 73/514.16 |
| 2013/0192371 | A1 * | 8/2013 | Rytkonen | G01P 15/02 73/514.32 |
| 2013/0255382 | A1 * | 10/2013 | Tanaka | G01P 15/125 73/514.32 |
| 2013/0283913 | A1 * | 10/2013 | Lin | G01P 15/125 73/514.32 |
| 2014/0230550 | A1 * | 8/2014 | Simoni | G01P 15/125 73/514.32 |
| 2014/0305211 | A1 * | 10/2014 | Malvern | G01P 15/125 73/514.32 |
| 2015/0301075 | A1 * | 10/2015 | Yamanaka | G01P 15/125 73/1.38 |
| 2016/0252544 | A1 * | 9/2016 | Malvern | G01P 15/125 73/514.32 |
| 2016/0334439 | A1 * | 11/2016 | Malvern | B81B 5/00 |

FOREIGN PATENT DOCUMENTS

| | | |
|---|---|---|
| JP | 2010071912 A | 4/2010 |
| TW | 201332880 A | 8/2013 |
| WO | 2004076340 A1 | 9/2004 |
| WO | 2005083451 A1 | 9/2005 |
| WO | 2012076837 A1 | 6/2012 |
| WO | 2013050752 A1 | 4/2013 |

OTHER PUBLICATIONS

Japanese Office Action for Patent Application No. JP 2016-552946 dated Jun. 19, 2018 (Original) 3 pages.

Japanese Office Action for Patent Application No. JP 2016-552946 dated Jun. 19, 2018 (Global Dossier Translation) 3 pages.

* cited by examiner

ACCELEROMETERS

CROSS REFERENCE TO RELATED APPLICATIONS

This is a US National Stage of Application No. PCT/GB2015/050435, filed on Feb. 16, 2015, which claims the benefit of GB Application No. 1402936.7 filed Feb. 19, 2014, the disclosures of which are incorporated herein by reference.

TECHNICAL FIELD

The present disclosure relates to sensing structures for accelerometers, in particular to capacitive sensing structures for accelerometers.

BACKGROUND

Accelerometers are electromechanical devices that can measure acceleration forces due to motion and/or vibration. Accelerometers find use in a wide variety of applications, including seismic sensing, vibration sensing, inertial sensing and tilt sensing. Capacitive accelerometers are typically manufactured from silicon and implemented as micro electromechanical systems (MEMS) structures. A typical MEMS capacitive sensing structure comprises a proof mass moveably mounted relative to a support. A set of moveable electrode fingers extending from the proof mass are interdigitated with one or more sets of fixed electrode fingers, with differential capacitance between the electrode fingers being measurable so as to detect deflection of the proof mass in a sensing direction. An accelerometer comprising the sensing structure includes appropriate electronics for the drive and pickoff signals.

WO 2004/076340 and WO 2005/083451 provide examples of capacitive accelerometers comprising a plurality of interdigitated fixed and moveable electrode fingers extending substantially perpendicular to the sensing direction of the MEMS device. The electrode fingers are formed from a single silicon substrate, for example using deep reactive ion etching (DRIE). The silicon substrate is typically anodically bonded to a glass support with pre-cavitation of the glass where the elements move. After bonding and DRIE, a cap glass wafer is added to give a hermetic assembly with a gaseous medium trapped inside. The atmospheric pressure gas (typically argon) provides critical squeeze film damping for the proof mass when it moves. Down hole vias are then added to make electrical connection from the top surface of the glass support to the active silicon elements. The glass support offers high electrical insulation, but there is a mismatch in the coefficient of thermal expansion which depends on the glass type. For example, SD2 glass (alumino-silicate) gives a better thermal match than Pyrex (boro-silicate). Glass is used in preference to silicon (such as bonded silicon on oxide technology) for the support, as it reduces the stray capacitance to ground.

A prior art example of an accelerometer is described in WO 2012/076837 and seen in FIG. 1. In this sensing structure the proof mass is split into first and second mass elements arranged on opposite sides of a pair of fixed capacitor electrodes. The mass elements may be rigidly interconnected by a brace bar to form a unitary moveable proof mass. The mass elements are mounted to the underlying support by a set of four flexible legs that connect to separate top and bottom anchor points. The anchor points and the two sets of fixed electrode fingers are anodically bonded to the underlying glass support. A problem with this design is that differential expansion between the glass support and the silicon substrate arises when there is a temperature change. In the case of uniform thermal expansion, the two fixed electrodes move symmetrically (e.g. outwards) with respect to the two anchor points, which causes a scale factor shift as the electrode finger gaps are changed. In the case of a thermal gradient across the device, the two fixed electrodes move asymmetrically with respect to each other, resulting in a bias shift. Operating in open loop, the sensitivity of such a device is typically 30 nm/g (for a 30 g range), so 30 pm of relative movement gives rise to 1 mg of bias shift. Stressing of the support glass may result from thermal expansions/gradients, or be induced by the diebond used in the device package. The diebond is an elastomeric material with a low Young's modulus which normally has a high coefficient of thermal expansion and may also suffer from ageing effects.

The present disclosure seeks to reduce or overcome the disadvantages outlined above.

SUMMARY

According to a first aspect of this disclosure there is provided a sensing structure for an accelerometer, comprising:

a support and a proof mass mounted to the support by flexible legs for in-plane movement in response to an applied acceleration along a sensing direction;

the proof mass comprising a plurality of moveable electrode fingers extending substantially perpendicular to the sensing direction and spaced apart in the sensing direction; and at least one pair of fixed capacitor electrodes comprising first and second sets of fixed electrode fingers extending substantially perpendicular to the sensing direction and spaced apart in the sensing direction;

the first set of fixed electrode fingers arranged to interdigitate with the moveable electrode fingers with a first offset in one direction from a median line therebetween, and the second set of fixed electrode fingers arranged to interdigitate with the moveable electrode fingers with a second offset in the opposite direction from a median line therebetween;

wherein the proof mass takes the form of an outer frame surrounding the at least one pair of fixed capacitor electrodes, the flexible legs extending laterally inwardly from the proof mass to a central anchor having a position along the sensing direction that is centred with respect to the pair(s) of fixed capacitor electrodes.

Thus in accordance with this disclosure the proof mass takes the form of an outer frame that is anchored centrally of the pair(s) of fixed capacitor electrodes at a single point. With a central anchor point, the proof mass frame is less likely to move with respect to the fixed electrode fingers in the presence of a thermal gradient. This reduces the accelerometer bias resulting from an expansion rate difference between the support and the material of the proof mass (e.g. silicon).

In a set of examples, the sensing structure comprises at least two pairs of fixed capacitor electrodes. In an accelerometer, the first and second sets of fixed electrode fingers of each pair may be driven in anti-phase to one another. The proof mass anchor retains a position along the sensing direction that is centred with respect to the two or more pairs of fixed capacitor electrodes. This means that one pair of fixed capacitor electrodes may be positioned above the central anchor while the other pair of fixed electrode fingers may be positioned below the central anchor (i.e. looking along the sensing direction). In each pair of fixed electrodes, the first and second sets of fixed electrode fingers may lie next to one another along the sensing direction rather than being spaced apart by a brace bar, as in the prior art. The first and second sets of fixed electrode fingers of each pair being driven in anti-phase results in a differential pair. The two first sets of fixed electrode fingers may be electrically connected in phase, while the two second sets of fixed electrode fingers may be connected in anti-phase. In the presence of a uniform temperature change, this double differential scheme causes both pairs of fixed capacitor electrodes to move by the same amount and therefore cancel out any bias shift and minimise the scale factor shift. Compared to prior art designs, the scale factor variation may be reduced by a factor of 10.

In at least some examples of the present disclosure, the sensing structure may comprise more than two pairs of fixed capacitor electrodes. It is possible that the sensing structure may comprise three differential electrode pairs, or any other odd number of fixed capacitor electrode pairs. Any arrangement of more than one differential pair of fixed electrode fingers will provide an improvement in the stability of the scale factor under a uniform temperature change, but it has been calculated that an optimal arrangement uses an even number of fixed capacitor electrode pairs. Thus in some examples the sensing structure may comprise at least 4, 6, 8, etc. (or any even number) of pairs of fixed capacitor electrodes, the first and second sets of fixed electrode fingers of each pair being driven in anti-phase. It has been calculated that the improvement in open loop sensitivity under a temperature gradient is less using an odd number of differential electrode pairs as compared to an even number.

Where the proof mass takes the form of an outer frame surrounding the one or more pairs of fixed capacitor electrodes, the fixed capacitor electrodes may be arranged centrally within the outer frame. The arrangement of the electrodes in the sensing structure may by symmetrical in the sensing direction and/or perpendicular to the sensing direction. Each pair of fixed capacitor electrodes may comprise an anchor that is aligned laterally with the central anchor of the proof mass. This may facilitate shared electrical connections between the various elements of the accelerometer. For example, each pair of fixed capacitor electrodes may be anchored to the support at a central position aligned with the central anchor of the proof mass along the sensing direction. For each pair of fixed capacitor electrodes, a single shared electrical connection may be provided for the first and second sets of fixed electrode fingers. This can reduce the number of separate electrical connections that are required. Where two or more pairs of fixed capacitor electrodes are driven in anti-phase, there may be provided at least four separate electrical connections, one for each pair of fixed capacitor electrodes, in line with a fifth electrical connection for the proof mass.

In a first set of examples the sensing structure comprises two pairs of fixed capacitor electrodes arranged symmetrically along the sensing direction with one pair either side of the central anchor. The first and second sets of fixed electrode fingers of the upper pair may have mirror symmetry with the first and second sets of fixed electrode fingers of the lower pair, with an axis of symmetry passing through the central anchor. In an accelerometer where the sensing structure comprises two pairs of fixed capacitor electrodes with a first and second upper set of fixed electrode fingers above the central anchor and a first and second lower set of fixed electrode fingers below the central anchor arranged to have symmetrical offset, the first upper set of fixed electrode fingers may be driven in phase with the first lower set of fixed electrode fingers and the second upper set of fixed electrode fingers may be driven in phase with the second lower set of fixed electrode fingers. Due to the symmetrical arrangement of the electrode fingers, differential capacitance changes due to a uniform temperature change will be cancelled out. Furthermore, inverting the drive phases will invert the signal sense so a double demodulation ("chopping stabilisation") is possible to take out demodulator errors. This may be used to take out electronic offsets of a demodulator connected to the sensing structure in an accelerometer. If the electrodes are mounted to the support by a die bond that suffers from ageing problems, then the scale factor shift previously observed during the high temperature operational lifetime may be significantly reduced. This depends on the presence of a uniform die bonding across the surface of the support.

In another set of examples, two pairs of fixed capacitor electrodes may be arranged either side of the central anchor without mirror symmetry along the sensing direction, in order to account for non-uniform changes resulting from a temperature gradient across the device. However, the effects of such thermal gradients are likely to be much smaller than the effects of a uniform temperature change. In such examples the sensing structure may comprise two pairs of fixed capacitor electrodes with a first and second upper set of fixed electrode fingers above the central anchor and a first and second lower set of fixed electrode fingers below the central anchor arranged to have opposite offsets. In an accelerometer comprising such a sensing structure, the first upper set of fixed electrode fingers may be driven in phase with the second lower set of fixed electrode fingers and the second upper set of fixed electrode fingers may be driven in phase with the first lower set of fixed electrode fingers. The opposite offsets may be arranged so as to provide compensation under a temperature gradient. This may occur due to the presence of an external temperature gradient, or if there is a non-uniform thermal flow, for example driven by a non-uniform die bond between the electrodes and the underlying support. An offset die bond can otherwise result in a bias, for example due to differential relaxation of the die bond material with age.

Where the examples above relate to two pairs of fixed capacitor electrodes, it will be understood that any even number of pairs of fixed capacitor electrodes may also be arranged either side of the central anchor, for example four pairs of fixed capacitor electrodes. In an accelerometer, such multiple pairs of electrodes may be driven symmetrically or asymmetrically, as described above.

In examples of the present disclosure, the sensing structure may be connected to suitable drive and pickoff electronics to form an accelerometer. In the accelerometer, each pair of fixed capacitor electrodes may be driven in an open loop or closed loop configuration. In an open loop configuration, for example, open loop electronics are arranged to drive the first and second sets of fixed electrode fingers of each pair in anti-phase. The open loop electronics may apply sine wave or square wave drive signals. In open loop operation, the proof mass moves freely under acceleration between the first and second sets of fixed electrode fingers and the differential change in capacitance is proportional to the deflection of the proof mass. The pickoff signal in these examples may be the rectified voltage appearing on the output (e.g. after low pass filtering). Operation of an open loop accelerometer is described in more detail in WO 2004/076340, the contents of which are incorporated herein by reference.

In a closed loop configuration, for example, closed loop electronics are arranged to drive the first and second sets of fixed electrode fingers of each pair in anti-phase. The drive electronics provide a variable electrostatic force to the electrodes to achieve force balancing. The proof mass is fixed in position by virtue of electrostatic forces nulling the inertial force due to acceleration. In an analogue approach, the closed loop electronic may apply separate driving and sensing signals, i.e. separation in the time domain. For example, an AC voltage signal may be used for sensing while a static voltage is varied in magnitude to provide a feedback signal driving the electrodes with an electrostatic restoring force on the proof mass that balances the inertial force of the applied acceleration. In a digital approach, pulse width modulation (PWM) signals may be applied for both driving and sensing by separating the excitation and feedback signals in the frequency domain. For example, for a proof mass having a resonant frequency of around 1-3 kHz, the PWM drive signals may be at a frequency of around 100 kHz. In some examples, the closed loop electronics may apply pulse width modulation (PWM) drive signals that may have an adjustable mark:space ratio to vary the electrostatic restoring force on the proof mass. The pickoff signal in these examples is taken from the proof mass using the PWM drive signals. Operation of a closed loop accelerometer is described in more detail in WO 2005/083451, the contents of which are incorporated herein by reference.

The proof mass may be mounted to the support by any suitable number of flexible legs. In one set of examples, opposite sides of the outer frame may be connected to the central anchor by a pair of flexible legs. For example, the pair of flexible legs extending from opposite sides of the central anchor. It has been recognised that mounting the proof mass to the support by two or more separated pairs of flexible legs can improve the out-of-plane rotational stiffness. This may enable the sensing structure to provide a higher resonant frequency for the unwanted out-of-plane mode.

The flexible support legs set the resonance frequency of the proof mass and hence the sensitivity of the sensing structure and accelerometer. The proof mass may be mounted by a plurality of equally spaced flexible support legs, for example two or four support legs extending towards the central anchor. Each support leg may extend in a direction substantially perpendicular to the sensing direction of the accelerometer so that when the proof mass moves in response to an applied acceleration the support legs flex and apply a restoring force urging the proof mass back towards a rest position. The shorter the support legs, the higher the resonance frequency of the proof mass. It is desirable to reduce the resonance frequency without significantly increasing the overall dimensions of the device. In a particularly suitable set of examples, the support legs have a serpentine form. Moreover it is disclosed that each support leg may comprise at least a first generally straight section, a second generally straight section, and an end section of generally U-shaped form interconnecting the first and second generally straight sections, wherein the thickness of the end section is greater than the thickness of a central part of both of the first and second generally straight sections. This construction of the support legs represents a particularly beneficial serpentine form with increased thickness for the end sections, which are most highly stressed in the event of a significant out-of-plane acceleration being applied. The support legs may have a serpentine form substantially as described in WO 2013/050752, the contents of which are incorporated herein by reference.

In many examples of this disclosure, the proof mass and the fixed capacitor electrodes may be integrally formed from a semiconductor substrate, for example a silicon substrate. The outer frame of the proof mass may be fabricated from the semiconductor substrate by an etching process such as deep reaction ion etching (DRIE). In a MEMS structure, the proof mass and the fixed capacitor electrodes may be formed in the same plane. The central anchors may be fixedly bonded, e.g. anodically bonded to the underlying electrically insulating support (for example glass).

An accelerometer comprising a sensing structure as disclosed herein may further comprise any suitable gaseous medium to provide a damping effect for the interdigitated capacitive electrode fingers. The gaseous medium may comprise one or more of air, nitrogen, argon, helium or neon. However neon may be chosen (e.g. rather than argon) to increase the damping factor. Accordingly the accelerometer may contain neon gas to provide damping for the interdigitated electrode fingers.

In any of the examples disclosed herein, the sensing structure may take the form of a MEMS, in particular a MEMS formed from a semiconductor substrate, for example a silicon substrate. The support may consist of an electrically insulating e.g. glass base that supports the semiconductor substrate. Anodic bonding may be used, as is well known in the art. Anodically bonding the semiconductor substrate to an electrically insulating e.g. glass base has the advantage of electrically isolating the capacitance of the interdigitated electrode fingers from the ground plane. Small capacitance changes are very important for the accuracy of sensing structure in a capacitive accelerometer.

The moveable and fixed electrode fingers may extend laterally i.e. sideways from the proof mass or fixed capacitor electrode, respectively, to be spaced apart in a comb-like form.

It will be appreciated that the term "moveable" is used to indicate that the fingers are able to move relative to the support, and any electrode fixed to the support, by virtue of the fact that the proof mass as a whole is moveable relative to the support due to being mounted by the flexible legs. Of course individual electrode fingers are not moveable relative to the proof mass.

BRIEF DESCRIPTION OF THE DRAWINGS

One or more non-limiting examples will now be described with reference to the accompanying drawings, in which:

FIG. 1 shows a prior art form of capacitive accelerometer 1 similar to that described in WO 2012/076837. A moveable proof mass and capacitor electrodes are etched from a silicon wafer mounted to an underlying support. A first mass element 2 is mounted to the support by first flexible legs 2a, 2b and a second mass element 4 is mounted to the support by second flexible legs 4a, 4b. The upper flexible legs 2a, 4a are connected to an upper anchor 6 while the lower flexible legs 2b, 4b are connected to a lower anchor 8. The upper and lower anchors 6, 8 are separately attached to the support, e.g. by anodic bonding. A single pair of fixed capacitor electrodes is located between the first and second mass elements 2, 4. The pair of fixed capacitor electrodes comprises a first upper set of fixed electrode fingers 10 and a second lower set of fixed electrode fingers 12, driven in anti-phase. The fixed electrode fingers 10, 12 extend substantially perpendicular to the sensing direction (indicated by the double-headed arrow) and are interdigitated with corresponding sets of movable electrode fingers 14, 16 extending laterally inwardly from the first and second mass elements 2, 4. The proof mass 2, 4 can move relative to the fixed electrodes 10, 12 in the in-plane sensing direction in response to an applied acceleration. The upper and lower sets of fixed electrode fingers 10, 12 are offset from the proof mass fingers 14, 16 in opposite directions, such that a movement in either direction can be measured from the differential capacitance generated.

Figure 1:
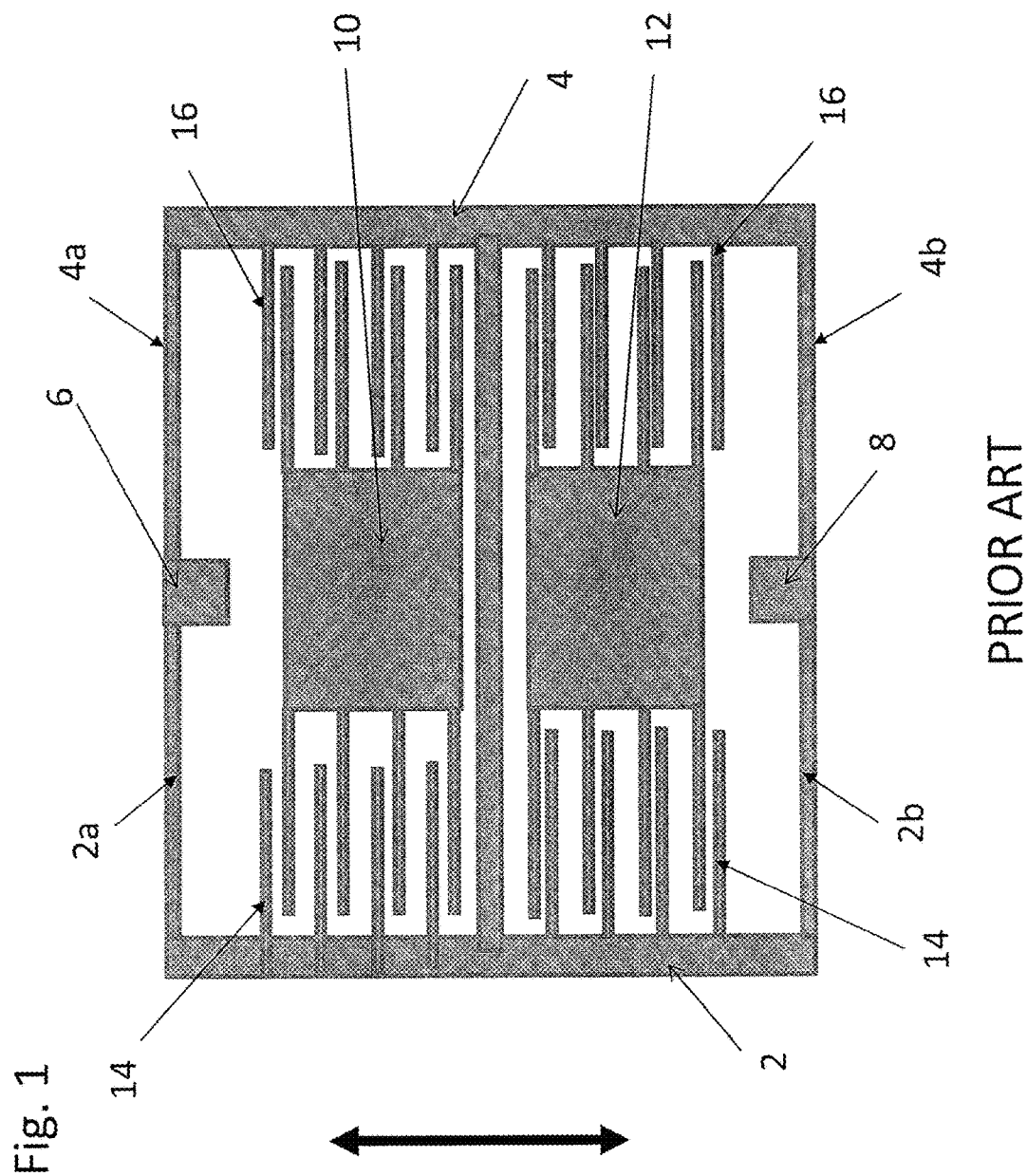
FIG. 1 shows a prior art form of accelerometer.

If this device 1 experiences a uniform temperature change causing differential expansion of the silicon layer relative to the support (e.g. glass), then the upper and lower anchors 6, 8 move together/apart and the upper and lower sets of fixed electrode fingers 10, 12 move together/apart. Symmetrical expansion will cause a scale factor variation as a function of temperature. Even using SD-2 glass for the support, which has a good thermal expansion match to silicon, this may result in a scale factor shift of 40 ppm/° C. Furthermore, if the anchor points 6, 8 or the fixed electrodes 10, 12 move apart unsymmetrically, for example due to thermal expansion or stressing of the underlying glass support, then there will be a bias shift. This may result in an uncompensated bias as function of temperature of the order of 1 mg/° C. It is desirable to improved the temperature stability of capacitive accelerometers.

The differential capacitance is written below:

$$\Delta C = A\varepsilon_0 \left\{ \frac{1}{(d_1 - x)} - \frac{1}{(d_1 + x)} \right\}$$

$$\text{for } d_1 = d + \delta,$$

where x is the deflection due to acceleration, d is the initial finger gap and $\delta$ is the thermally induced deformation. This is expanded as below:

$$\Delta C = \frac{A\varepsilon_0}{d_1} \left\{ \frac{1}{\left(1 - \frac{x}{d_1}\right)} - \frac{1}{\left(1 + \frac{x}{d_1}\right)} \right\}$$

$$= \frac{A\varepsilon_0}{d_1} \left\{ \frac{2x}{d_1} \right\}$$

$$= \frac{2xA\varepsilon_0}{d^2} \left\{ 1 - \frac{2\delta}{d} \right\}.$$

The scale factor is given by the derivative with respect to x as below:

$$\frac{\partial \Delta C}{\partial x} = \frac{2A\varepsilon_0}{d^2} \left\{ 1 - \frac{2\delta}{d} \right\}.$$

In terms of thermal gradient effects, The differential capacitance is given by:

$$\Delta C = A\varepsilon_0 \left\{ \frac{1}{(d_1 - x)} - \frac{1}{(d_2 + x)} \right\},$$

where $d_1 = d - \delta$, $d_2 = d + \delta$, x is the offset due to acceleration, and $\delta$ is the movement of the two fixed electrode sets due to a thermal gradient. From FIG. 1, it can be seen that the upper set moves upwards closing the gap ($\delta$ is negative) and the lower set moves upwards increasing the gap ($\delta$ is positive).

This is expanded to:

$$\Delta C = A\varepsilon_0 \left\{ \frac{1}{d_1}\left(1 + \frac{x}{d_1}\right) - \frac{1}{d_2}\left(1 - \frac{x}{d_2}\right) \right\}$$

$$= A\varepsilon_0 \left\{ \frac{1}{d_1} - \frac{1}{d_2} + x\left(\frac{1}{d_1^2} + \frac{1}{d_2^2}\right) \right\}$$

$$= \frac{A\varepsilon_0}{d} \left\{ \left(1 + \frac{\delta}{d}\right) - \left(1 - \frac{\delta}{d}\right) + \frac{x}{d}\left(1 + \frac{x}{d} + 1 - \frac{x}{d}\right) \right\}$$

$$= \frac{2A\varepsilon_0}{d^2} \{x + \delta\}$$

Under a thermal gradient there is a bias of $$\frac{2A\varepsilon_0 \delta}{d^2}$$

and no scale factor shift.

These calculations can be compared to the present disclosure, as follows.

Figure 2:
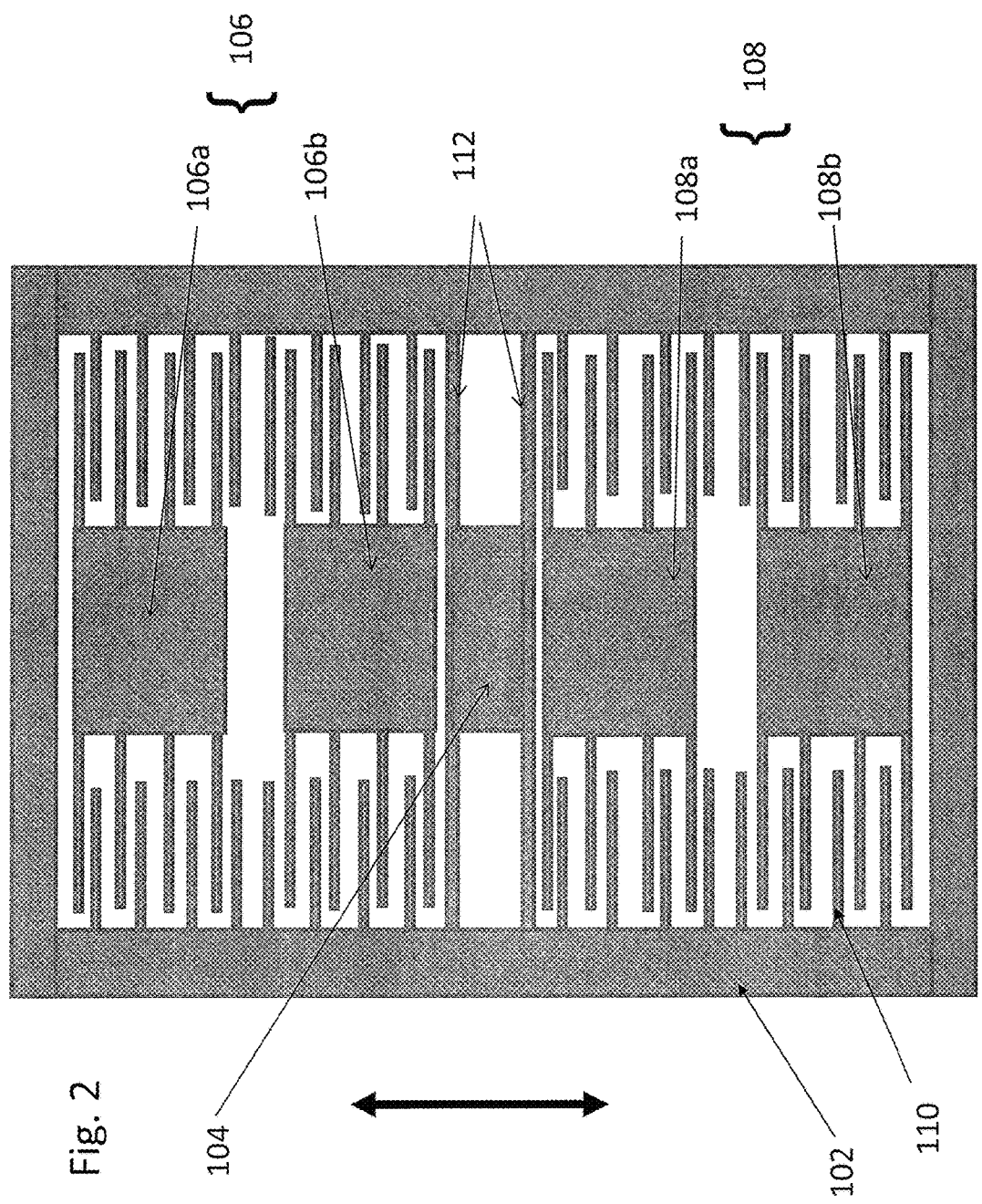
FIG. 2 shows an exemplary accelerometer in accordance with this disclosure.

There is disclosed with reference to FIG. 2 a capacitive accelerometer 100 comprising a proof mass 102 taking the form of an outer frame. The proof mass 102 is attached to the underlying support by a central anchor 104, with the rest free to move. A pair of flexible support legs 112 extend between the proof mass frame 102 and the central anchor 104.

Two pairs 106, 108 of fixed capacitor electrodes are arranged inside the outer frame of the proof mass 102. Each pair 106, 108 comprises first and second sets of fixed electrode fingers, driven in anti-phase. The fixed electrode fingers extend substantially perpendicular to in the sensing direction (indicated by the double-headed arrow) and interdigitate with corresponding sets of movable electrode fingers 110 extending laterally inwardly from the proof mass frame 102. In the upper differential pair 106, the first and second sets of fixed electrode fingers 106a, 106b are offset from the proof mass fingers 110 in opposite directions. In this example, the first and second sets of fixed electrode fingers 108a, 108b in the lower differential pair 108 have mirror symmetry with the upper differential pair 106. The first upper and lower fixed electrodes 106a and 108a are coupled together and the second upper and lower fixed electrodes 106b and 108b are coupled together, for example by metal tracking on an upper glass layer with downhole vias to make the electrical connections. The first upper and lower fixed electrodes 106a and 108a may be driven by an in-phase square wave (open loop) or in-phase PWM signal (closed loop), and the second upper and lower fixed electrodes 106b and 108b may be driven by an anti-phase square wave (open loop) or an anti-phase PWM signal (closed loop). This means that a uniform temperature change causes all four sets of fixed electrode fingers to move in the same way, cancelling out, so that a differential capacitance change is eliminated as compared to the single differential pair of FIG. 1.

In FIG. 2 there are four sets of capacitances (1, 2, 3, 4) for the four sets of fingers. The differential capacitance is given below:

$$\Delta C = A\varepsilon_0 \left\{ \frac{1}{(d_1-x)} - \frac{1}{(d_2+x)} + \frac{1}{(d_2-x)} - \frac{1}{(d_1+x)} \right\},$$

where $d_1 = d+\alpha\delta$, $d_2 = d-\alpha\delta$ and $\alpha$ is a factor (~1.8) showing the greater distance from the centre of finger sets 106a and 108b as compared to 106b and 108a.

This is expanded as below:

$$\Delta C = A\varepsilon_0 \left\{ \frac{1}{d_1}\left(1+\frac{x}{d_1}\right) - \frac{1}{d_2}\left(1-\frac{x}{d_2}\right) + \frac{1}{d_2}\left(1+\frac{x}{d_2}\right) - \frac{1}{d_1}\left(1-\frac{x}{d_1}\right) \right\}$$

$$= 2A\varepsilon_0 \left\{ \frac{x}{d_1^2} + \frac{x}{d_2^2} \right\}.$$

The scale factor is given by:

$$\frac{\partial \Delta C}{\partial x} = \frac{2A\varepsilon_0}{d^2} \left\{ \left(1-2\alpha\frac{\delta}{d}\right) + \left(1+2\frac{\delta}{d}\right) \right\}$$

$$= \frac{4A\varepsilon_0}{d^2} \left\{ 1 + \frac{\delta}{d}(1-\alpha) \right\}$$

For $\alpha=1.5$, the scale factor sensitivity to temperature changes is four times smaller than for the accelerometer of FIG. 1.

If there is temperature gradient across the device then there is still a residual bias shift. This may occur, for instance, if the die bonding between the glass support and silicon layer is not symmetrical with respect to the centre of the device. In another unillustrated example, this can be compensated by the outermost fixed electrodes 106a and 108b being coupled together, and the innermost fixed electrodes 106b and 108a being coupled together. Under a temperature gradient, the upper fixed electrode fingers 106a, 106b move outwards from the central anchor 104 to give a positive differential capacitance and the lower fixed electrode fingers 108a, 108b move outwards from the central anchor 104 to give a negative differential capacitance. In this scheme the temperature gradient may be cancelled by the double differential capacitance. However such an arrangement is sensitive to uniform temperature changes.

Under a thermal gradient the differential capacitance is given by:

$$\Delta C = A\varepsilon_0 \left\{ \frac{1}{(d_1-x)} - \frac{1}{(d_2+x)} + \frac{1}{(d_3-x)} - \frac{1}{(d_4+x)} \right\}$$

where $d_1 = d+1.5\delta$, $d_2 = d-\delta$, $d_3 = d+\delta$, $d_4 = d-1.5\delta$.

Under thermal gradient, fixed set 106a increases the gap, fixed set 106b decreases the gap, fixed set 108a increases the gap and fixed set 108b decreases the gap. This gives:

$$\Delta C = A\varepsilon_0 \left\{ \frac{1}{d_1}\left(1+\frac{x}{d_1}\right) - \frac{1}{d_2}\left(1-\frac{x}{d_2}\right) + \frac{1}{d_3}\left(1+\frac{x}{d_3}\right) - \frac{1}{d_4}\left(1-\frac{x}{d_4}\right) \right\}$$

This gives:

$$\Delta C = A\varepsilon_0 \left\{ \frac{1}{d_1} - \frac{1}{d_2} + \frac{1}{d_3} - \frac{1}{d_4} + \frac{x}{d_1^2} + \frac{x}{d_2^2} + \frac{x}{d_3^2} + \frac{x}{d_4^2} \right\}$$

$$= \frac{A\varepsilon_0}{d} \left\{ \begin{array}{l} \left(1-\frac{1.5\delta}{d}\right) - \left(1+\frac{\delta}{d}\right) + \left(1-\frac{\delta}{d}\right) - \left(1+\frac{1.5\delta}{d}\right) + \\ \frac{x}{d}\left[\left(1-\frac{3\delta}{d}\right) + \left(1+\frac{2\delta}{d}\right) + \left(1-\frac{2\delta}{d}\right) + \left(1+\frac{3\delta}{d}\right)\right] \end{array} \right\}$$

$$= \frac{A\varepsilon_0}{d} \left\{ \frac{-5\delta}{d} + \frac{x}{d}(4) \right\}$$

In this case there is a bias of:

$$\Delta C = \frac{-5\delta A\varepsilon_0}{d^2}$$

The area A is ½ the area for the device of FIG. 1, so while the FIG. 1 accelerometer has a factor of 6, the device of FIG. 2 has a factor of 2.56 (i.e. better under a temperature gradient by a factor of about 2).

Further examples may include more than two pairs of fixed capacitor electrodes, possibly an odd number, but most favourably an even number of pairs arranged either side of the central anchor. For example, a scheme of four pairs comprising eight sets of fixed electrode fingers would provide similar benefits based on the same principles.

Although the example of FIG. 2 has been described in the context of two pairs of fixed electrodes, a reduction in thermal expansion effects relative to the device of FIG. 1 may also be achieved by arranging a single pair of fixed electrodes, driven in anti-phase, either side of a central anchor. By replacing the two outer anchor points with a single anchor point at the centre of the device, the outer proof mass frame is less likely to move with respect to the fixed electrodes as the frame anchor is positioned centrally between the first and second sets of fixed electrode fingers.

The invention claimed is:

1. An accelerometer comprising a sensing structure, the sensing structure comprising:
    a support and a proof mass mounted to the support by flexible legs for in-plane movement in response to an applied acceleration along a sensing direction;
    the proof mass comprising a plurality of moveable electrode fingers extending substantially perpendicular to the sensing direction and spaced apart in the sensing direction; and
    two pairs of fixed capacitor electrodes, each comprising first and second sets of fixed electrode fingers extending substantially perpendicular to the sensing direction and spaced apart in the sensing direction;
    the first set of fixed electrode fingers arranged to interdigitate with the moveable electrode fingers with a first offset in one direction from a median line therebetween, and the second set of fixed electrode fingers arranged to interdigitate with the moveable electrode fingers with a second offset in the opposite direction from a median line therebetween;
    wherein the proof mass takes the form of an outer frame surrounding the two pairs of fixed capacitor electrodes, the flexible legs extending laterally inwardly from the proof mass to a central anchor having a position along the sensing direction that is centred with respect to the two pairs of fixed capacitor electrodes;
    wherein the two pairs of fixed capacitor electrodes provide a first and second upper set of fixed electrode fingers on a first side of the central anchor in the sensing direction and a first and a second lower set of fixed electrode fingers on a second side of the central anchor in the sensing direction arranged to have symmetrical offsets, the first upper set of fixed electrode fingers being driven in phase with the first lower set of fixed electrode fingers and the second upper set of fixed electrode fingers being driven in phase with the second lower set of fixed electrode fingers.

2. The accelerometer according to claim 1, comprising an even number of further pairs of fixed capacitor electrodes.

3. The accelerometer according to claim 1, wherein the first and second sets of fixed electrode fingers of each pair of fixed capacitor electrodes are anchored to the support at a central position in line with the central anchor of the proof mass.

4. The accelerometer according to claim 1, comprising a shared electrical connection for the first and second sets of fixed electrode fingers of each pair of fixed capacitor electrodes, arranged in line with a central electrical connection for the proof mass.

5. The accelerometer according to claim 1, wherein the proof mass is connected to the central anchor by two or more separated pairs of flexible legs.

6. The accelerometer according to claim 1, wherein the sensing structure is a MEMS.

7. The accelerometer according to claim 1, wherein the support is made of glass.

8. The accelerometer according to claim 1, wherein open loop electronics are arranged to drive the first and second sets of fixed electrode fingers of each pair of fixed capacitor electrodes in anti-phase.

9. The accelerometer according to claim 1, wherein closed loop electronics are arranged to drive the first and second sets of fixed electrode fingers of each pair of fixed capacitor electrodes in anti-phase.

10. An accelerometer comprising a sensing structure, the sensing structure comprising:
   a support and a proof mass mounted to the support by flexible legs for in-plane movement in response to an applied acceleration along a sensing direction;
   the proof mass comprising a plurality of moveable electrode fingers extending substantially perpendicular to the sensing direction and spaced apart in the sensing direction; and
   two pairs of fixed capacitor electrodes, each comprising first and second sets of fixed electrode fingers extending substantially perpendicular to the sensing direction and spaced apart in the sensing direction;
   the first set of fixed electrode fingers arranged to interdigitate with the moveable electrode fingers with a first offset in one direction from a median line therebetween, and the second set of fixed electrode fingers arranged to interdigitate with the moveable electrode fingers with a second offset in the opposite direction from a median line therebetween;
   wherein the proof mass takes the form of an outer frame surrounding the two pairs of fixed capacitor electrodes, the flexible legs extending laterally inwardly from the proof mass to a central anchor having a position along the sensing direction that is centred with respect to the two pairs of fixed capacitor electrodes;
   wherein the two pairs of fixed capacitor electrodes provide a first and a second upper set of fixed electrode fingers on first side of the central anchor and a first and a second lower set of fixed electrode fingers on a second side of the central anchor in the sensing direction arranged to have opposite offsets, the first upper set of fixed electrode fingers being driven in phase with the second lower set of fixed electrode fingers and the second upper set of fixed electrode fingers being driven in phase with the first lower set of fixed electrode fingers.

11. The accelerometer according to claim 10, comprising an even number of further pairs of fixed capacitor electrodes.

12. The accelerometer according to claim 10, wherein the first and second sets of fixed electrode fingers of each pair of fixed capacitor electrodes are anchored to the support at a central position in line with the central anchor of the proof mass.

13. The accelerometer according to claim 10, comprising a shared electrical connection for the first and second sets of fixed electrode fingers of each pair of fixed capacitor electrodes, arranged in line with a central electrical connection for the proof mass.

14. The accelerometer according to claim 10, wherein the proof mass is connected to the central anchor by two or more separated pairs of flexible legs.

15. The accelerometer according to claim 10, wherein the sensing structure is a MEMS.

16. The accelerometer according to claim 10, wherein the support is made of glass.

17. The accelerometer according to claim 10, wherein open loop electronics are arranged to drive the first and second sets of fixed electrode fingers of each pair of fixed capacitor electrodes in anti-phase.

18. The accelerometer according to claim 10, wherein closed loop electronics are arranged to drive the first and second sets of fixed electrode fingers of each pair of fixed capacitor electrodes in anti-phase.

* * * * *